Patented Aug. 14, 1951

2,564,249

UNITED STATES PATENT OFFICE 2,564,249

FUNGICIDAL COMPOSITIONS CONTAINING ALKYLCYCLOHEXYLMETHYLPYRIDINE

Francis E. Cislak, Indianapolis, Ind.

No Drawing. Application December 3, 1947,
Serial No. 789,573

4 Claims. (Cl. 167—58)

This invention relates generally to a method and to compositions of matter for controlling microorganisms, and more particularly to preventing or controlling the ravages of fungi.

I have discovered that cyclohexylmethylpyridines, and especially the alkylcyclohexylmethylpyridines, are startlingly effective fungicides. The discovery of the fungicidal properties of the cyclohexylmethylpyridines is entirely contrary to what might be expected. It has been reported that neither pyridine, 2-picoline, 3-picoline, 2,6-lutidine, nor quinoline are fungicidal (Horsfall—"Fungicides and Their Action" 1945). I have discovered that compositions comprising cyclohexylmethylpyridines are exceedingly effective fungicides.

These cyclohexylmethylpyridines have the general formula:

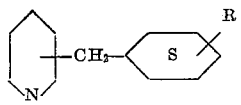

where R represents an alkyl group. The preparation of these compounds is described in U. S. Patent No. 2,505,461 dated April 25, 1950.

The table shows the relative fungicidal properties of cyclohexylmethylpyridines as determined by me. In this table I have arbitrarily assigned the value of unity to 2-methylpyridine. The remarkably high fungicidal properties of the alkylcyclohexylmethylpyridines are strikingly brought out in this table.

Table

| | |
|---|---|
| 2-methylpyridine | 1 |
| 4-cyclohexylmethylpyridine | 100 |
| 4-(2-methylcyclohexylmethyl)pyridine | 100 |
| 4-(4-ethylcyclohexylmethyl)pyridine | 1,666 |
| 2-(4-ethylcyclohexylmethyl)pyridine | 250 |
| 2-(3-ethylcyclohexylmethyl)pyiridine | 250 |
| 2-methyl-6-(2-methylcyclohexylmethyl)pyridine | 100 |
| 2,6-dimethyl-4-(3-methycyclohexylmethyl)pyridine | 100 |
| 4-(3-methylcyclohexylmethyl)pyridine | 142 |
| 4-(4-methylcyclohexylmethyl)pyridine | 166 |
| 2-(3,4-dimethylcyclohexylmethyl)pyridine | 100 |
| 2-(4-methylcyclohexylmethyl)pyridine | 100 |
| 4-(3-methyl-5-ethylcyclohexylmethyl)pyridine | 125 |
| 4-(2,4-dimethylcyclohexylmethyl)pyridine | 100 |
| 4-(3,4-dimethylcyclohexylmethyl)pyridine | 250 |
| 4-(3-ethylcyclohexylmethyl)pyridine | 500 |
| 2-methyl-6-(3-methylcyclohexylmethyl)pyridine | 100 |
| 2-methyl-6-(4-methylcyclohexylmethyl)pyridine | 100 |
| 4-(t-butylcyclohexylmethyl)pyridine | 250 |
| 2-(3,5-dimethylcyclohexylmethyl)pyridine | 200 |
| 2-(2,5-dimethylcyclohexylmethyl)pyridine | 50 |
| 4-(2,5-dimethylcyclohexylmethyl)pyridine | 142 |
| 4-(3,5-dimethylcyclohexylmethyl)pyridine | 142 |

The cyclohexylmethylpyridines are useful in controlling fungus infections of various kinds. Thus, they may be used in: (1) the preservation of wood; (2) the protection of fabrics against mildew; (3) the prevention of sap staining of lumber; (4) the preservation of leather from mold attack; (5) the protection of living plants against fungus diseases; (6) the disinfection of seeds; (7) the therapy of mycosis.

As ordinarily used in the control of fungus infections the cyclohexylmethylpyridines are admixed with a carrier. Suitable carriers are finely divided solids, such as talc, bentonite, and the like; or the carriers may be solvents for the cyclohexylmethylpyridines, such as alcohols, ketones, hydrocarbons, etc.; or the cyclohexylmethylpyridines may be dispersed in the form of emulsions. As examples of the type of compositions which I have found useful for the control of fungus infections I cite the following:

Example 1

Five pounds of 4-cyclohexylmethylpyridine is dissolved in 15 to 20 gallons of a petroleum naphtha, preferably a grade called Stoddard solvent or VMP naphtha. The resulting solution is an effective wood preservation agent for window sash, doors, etc.

Example 2

To 1 gallon of turpentine is added 5 ounces of a mixture of 4-(3-ethylcyclohexylmethyl)pyridine and 4-(4-ethylcyclohexylmethyl)pyridine. The resulting solution is useful in the mildewproofing of fabrics. The fabric to be treated is dipped into the solution and permitted to absorb the solution until the fabric has gained about 50% in weight. Then the fabric is allowed to dry in the air.

Example 3

Dissolve 10 grams of 4-(4-ethylcyclohexylmethyl)pyridine in 90 grams of Carbowax Compound 1500. The resulting ointment is useful in the treatment of mycosis such as athlete's foot, ringworm of the scalp, and other fungus diseases in humans. Clinical tests show this ointment to be non-irritating to the skin and to be not only fungistatic but also strongly fungicidal.

Carbowax 1500 is a trade-marked name for a blend of polyethyleneglycols having an average molecular weight of about 1500. The general formula of these polyethylene glycols is $$HOCH_2(CH_2OCH_2)_xCH_2OH$$

Example 4

Five grams of 4-(4-methylcyclohexylmethyl)-pyridine is absorbed on 95 grams of finely divided (300 mesh) talc or bentonite. This is done by adding the 4-(4-methylcyclohexylmethyl)pyridine to the talc, and then thoroughly mixing in a ball mill.

The powder thus obtained is particularly useful in the treatment of seeds, such as tomato seeds, to prevent the tender shoots from being attacked by the fungi investing the soil.

Example 5

A preparation suitable for the mildewproofing of leather goods is prepared by dissolving 200 grams of paraffin wax in 700 grams of a petroleum naphtha (Stoddard solvent) and then adding 100 grams of 4-(3,5-dimethylcyclohexylmethyl)pyridine.

Example 6

An ointment suitable for the treatment of fungus infections in humans is readily prepared as follows: A vanishing cream base is prepared by emulsifying 100 grams of stearic acid, 18 grams of lanolin, 5 grams of triethanolamine, and 240 grams of water. To the so formed emulsion are added 21 grams 4-(4-ethylcyclohexylmethyl)pyridine and 36 grams of diethylene glycol monoethylether.

It is to be understood that the above examples are given by way of illustration only. Many modifications will readily suggest themselves to those skilled in the art.

I claim as my invention:

1. A fungicidal composition comprising an organic solvent and an alkylcyclohexylmethylpyridine.
2. A fungicidal composition comprising an organic solvent and a 4-alkylcyclohexylmethylpyridine.
3. A fungicidal composition comprising an organic solvent and 4-(4-ethylcyclohexylmethyl)-pyridine.
4. A fungicidal composition comprising a polyethylene glycol and 4-(4-ethylcyclohexylmethyl)-pyridine.

FRANCIS E. CISLAK.

REFERENCES CITED

The following references are of record in the file of this patent:

UNITED STATES PATENTS

| Number | Name | Date |
|---|---|---|
| 2,219,847 | Purdum | Oct. 29, 1940 |
| 2,247,266 | Pieter | June 24, 1941 |
| 2,505,461 | Cislak et al. | Apr. 25, 1950 |

FOREIGN PATENTS

| Number | Country | Date |
|---|---|---|
| 347,451 | Great Britain | Apr. 30, 1931 |
| 526,868 | Germany | June 11, 1931 |

OTHER REFERENCES

Chichibabin, Chem. Abstracts, vol. 30 (1936), pages 8208, 8209.